(12) United States Patent
Ezer et al.

(10) Patent No.: US 6,256,655 B1
(45) Date of Patent: Jul. 3, 2001

(54) METHOD AND SYSTEM FOR PERFORMING FLOATING POINT OPERATIONS IN UNNORMALIZED FORMAT USING A FLOATING POINT ACCUMULATOR

(75) Inventors: Gulbin Ezer, San Jose; Sudhaker Rao, Mountain View; Timothy J. van Hook, Atherton, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/153,153

(22) Filed: Sep. 14, 1998

(51) Int. Cl.$^7$ .................................................. G06F 7/38
(52) U.S. Cl. ............................................... 708/501
(58) Field of Search ................... 708/501, 523, 708/603

(56) References Cited

U.S. PATENT DOCUMENTS

| | | | |
|---|---|---|---|
| 4,991,131 | * 2/1991 | Yeh et al. | 708/501 |
| 5,185,713 | * 2/1993 | Kobunaya | 708/501 |
| 5,517,438 | * 5/1996 | Duo-Trong et al. | 708/501 |
| 6,038,582 | * 3/2000 | Arakawa et al. | 708/501 |
| 6,115,729 | * 9/2000 | Matheny et al. | 708/501 |

\* cited by examiner

*Primary Examiner*—David H. Malzahn
(74) *Attorney, Agent, or Firm*—Wagner, Murabito & Hao LLP

(57) ABSTRACT

A method and system for performing floating point operations in unnormalized format using a floating point accumulator. The present invention provides a set of floating point instructions and a floating point accumulator which stores the results of the operations in unnormalized format. Since the present invention operates on and stores floating point numbers in unnormalized format, the normalization step in the implementation of the floating point operations, which is typically required in the prior art, is readily eliminated. The present invention thus provides significant improvements in both time and space efficiency over prior art implementations of floating point operations. In digital signal processing applications, where floating point operations are used extensively for sums of products calculations, the performance improvements afforded by the present invention are further magnified by the elimination of normalization in each of numerous iterations of multiply and add instructions. A method for computing floating point operations and the circuitry used by the method are described herein.

20 Claims, 11 Drawing Sheets

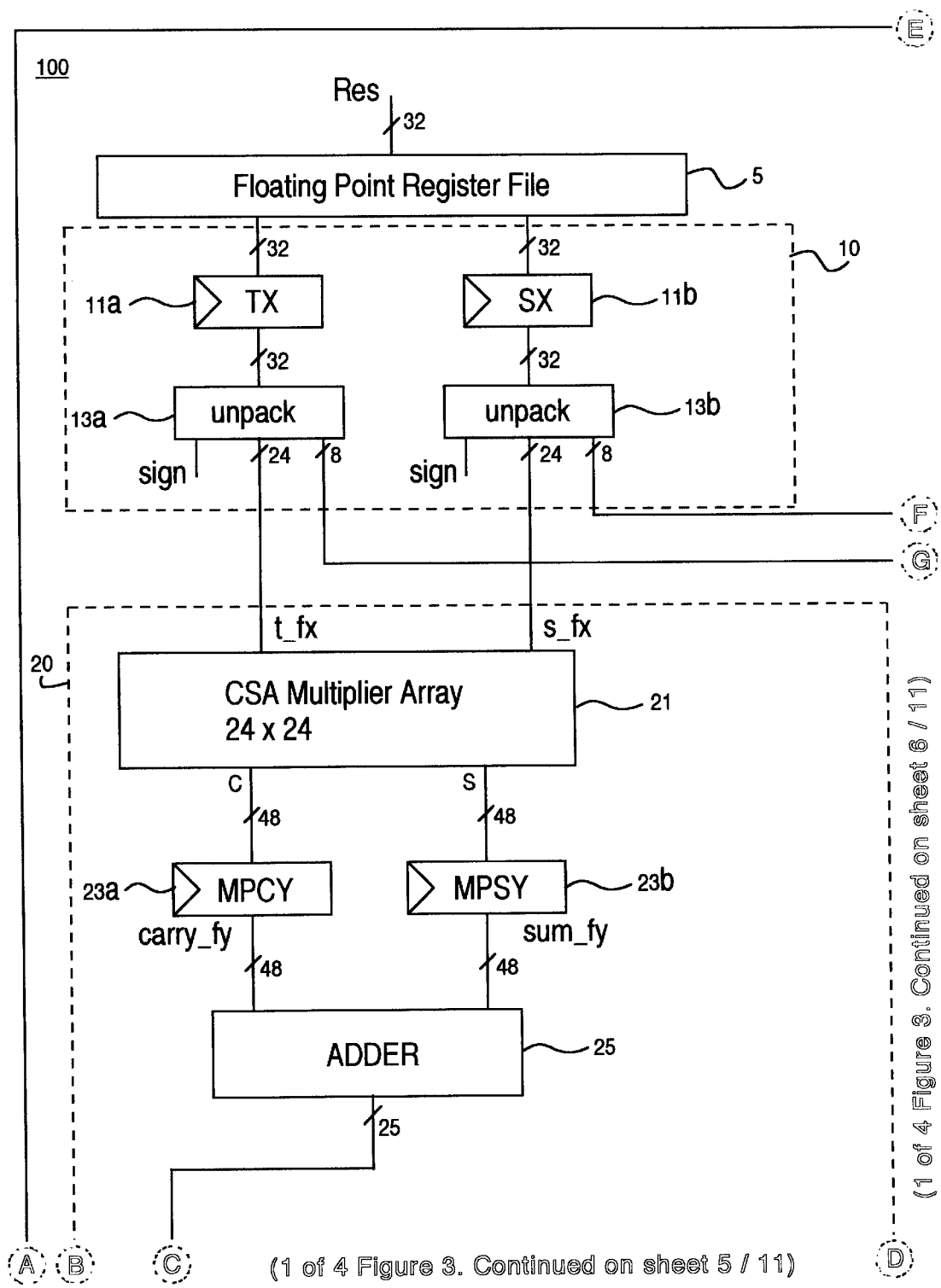
(1 of 4 Figure 3. Continued on sheet 5 / 11)

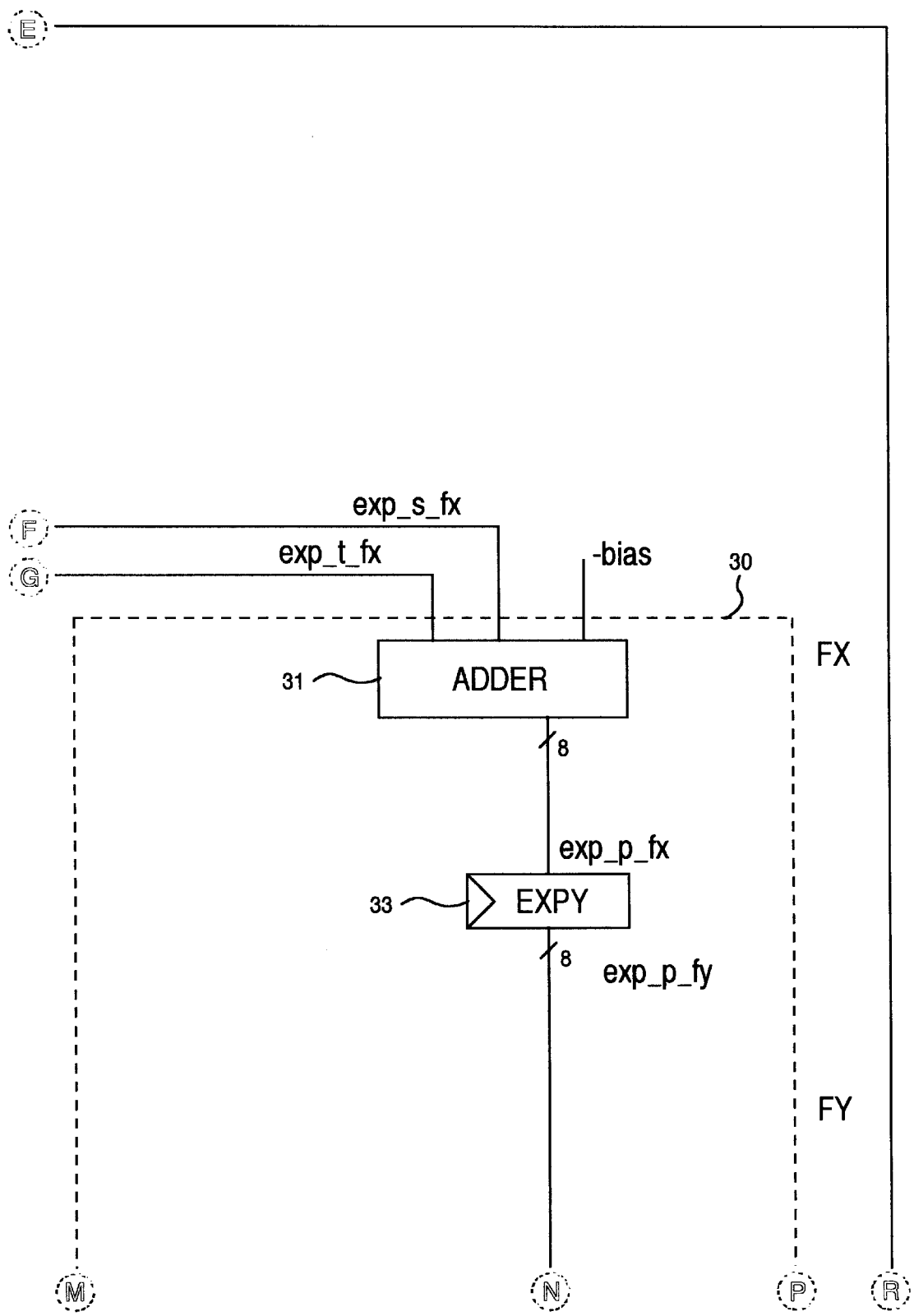
(3 of 4 Figure 3. Continued on sheet 7 / 11)

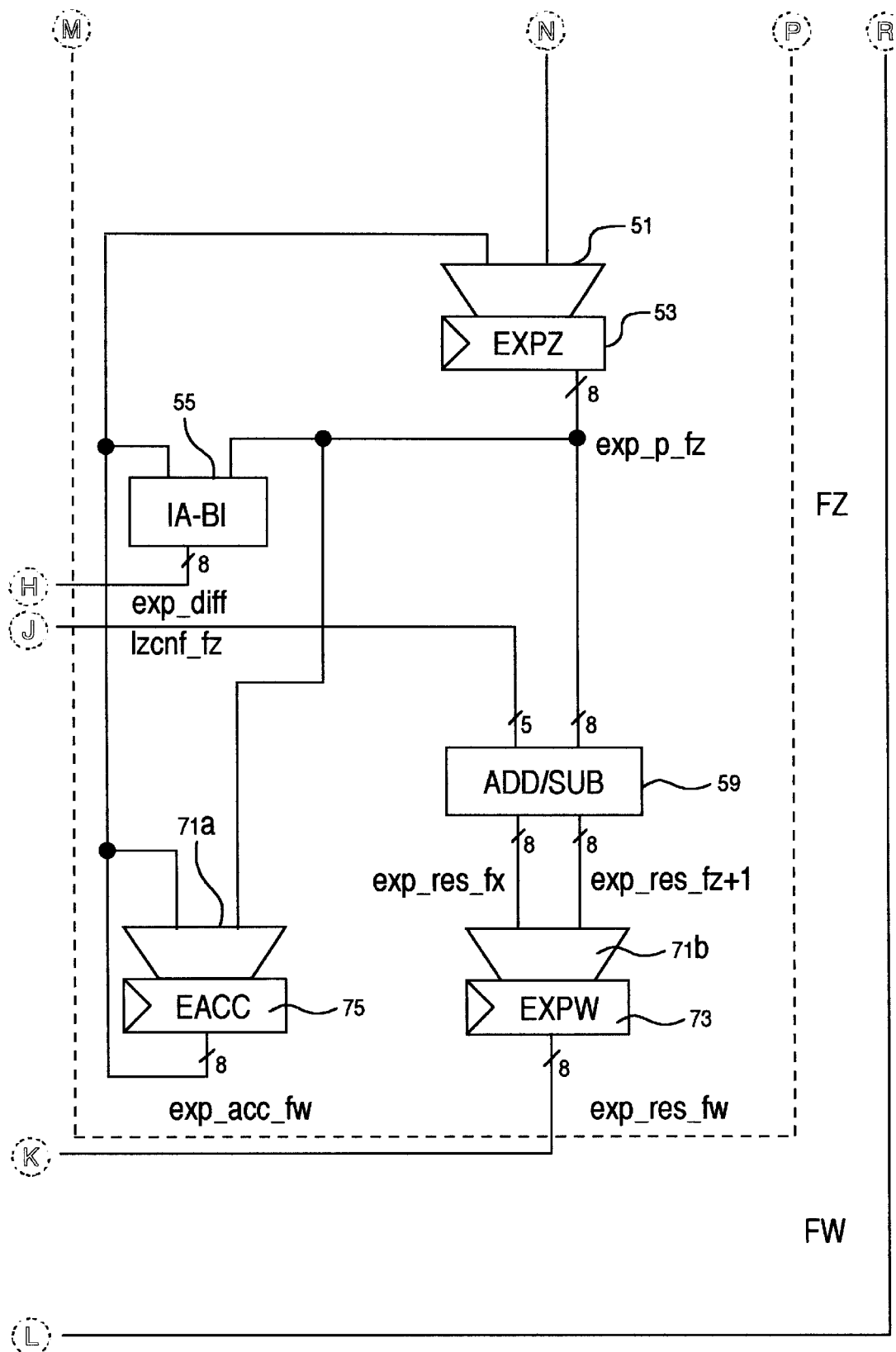
(4 of 4 Figure 3)

METHOD AND SYSTEM FOR PERFORMING FLOATING POINT OPERATIONS IN UNNORMALIZED FORMAT USING A FLOATING POINT ACCUMULATOR

BACKGROUND OF THE INVENTION

1. Field of the Invention

The present invention relates to the field of digital signal processing (DSP). More specifically, the present invention relates to the optimization of floating point operations in DSP systems

2. Prior Art

Many of today's computer applications require the processing of both integer and non-integer values. In modem computer systems, the predominant non-integer representation of numbers is the floating point representation as defined by the IEEE floating point standard (IEEE 754-1985). Accordingly, modem computer systems are usually dual-instruction machines with an integer datapath and a floating point datapath for handling integer operations and floating point operations, respectively.

Floating point operations are typically performed by a floating point unit in a processor, which is coupled to the floating point datapath of a computer system. Importantly, a floating point number is generally stored in normalized format in a floating point register (FPR) coupled to the floating point datapath. When a floating point operation needs to be performed, the floating point operands are converted from normalized format to unnormalized format before they are operated upon. Thereafter, the result is converted back to normalized format before it is stored back into the FPR. The FPR always stores normalized formatted data.

More particularly, in the field of digital signal processing (DSP), floating point representation is frequently used to provide the appropriate range and precision required in sums of products computations. For example, audio applications such as filtering and wave table synthesis, and graphic applications such as clipping, matrix transformation, vertex calculation and texture processing all involve large amounts of sums of products calculations. Thus, an efficient implementation of floating point operations is essential to computer systems running DSP applications.

In one prior art method, a floating point multiply and add instruction is used in conjunction with the FPR to implement sums of products computations. Specifically, in each multiply and add instruction, two floating point numbers are first multiplied to determine their product. The product is then added to a running total in the FPR, which is an intermediate result representing the sum of previously calculated products, to derive the sum of the newly calculated product and the current running total. This sum is then normalized and stored back into the FPR as the new running total. The multiply and add instruction is repeated for each iteration of the sum of products computation at hand.

However, this prior art method is inefficient because performing a normalization is expensive both in terms of computational time and area requirement. Under this prior art method, performing a sum of products calculation requires a normalization for every intermediate sum, thus the time and area requirements increase as the number of iterations becomes larger. Further, since typical DSP applications involve frequent sums of products calculations, the performance delivered by this prior art method further deteriorates. Thus, this prior art method is far from ideal for performing floating point operations, especially for DSP applications in which extensive iterations are commonplace.

Moreover, due to the need of the normalization per sum under this prior art method, there is a latency of typically four instruction cycles for the floating point multiply and add instruction. In other words, the result of an instruction is not available for use by a subsequent instruction until four instruction cycles later. This latency imposes significant restrictions on the design and implementation of pipelined instructions and adversely affects the overall performance of floating point operations provided by this prior art method. In addition, efficient implementations of today's sophisticated DSP applications frequently require a one-cycle turnaround, or in other words, that the result of an instruction be available in the next instruction cycle. The instant prior art method is therefore not well suited to the implementation of modem high speed DSP applications.

Another prior art method involves the use of integer accumulators to implement sums of products calculations. By using integer representations in the calculations, this prior art method avoids the normalization required in the prior art method using floating point operations described above, and thus does not present the inefficiency inherent therein. Further, by using an integer accumulator to store the running total during sums of products calculations, rather than storing such intermediate results into a register for every addition, this method actually offers an improvement in performance. However, integer representations cannot provide the range and precision offered by floating point representations. Since DSP applications increasingly call for larger range and higher precision, this prior art solution based on integer accumulators is inadequate to handle the demand of today's high performance DSP applications.

Thus, there exists a need for a method and system for performing floating point operations that is capable of providing the large range and high precision required by DSP applications and at the same time delivering such capability without sacrificing computational efficiency and overall performance. Furthermore, there exists a need for a method and system for performing floating point operations which does not incur significant latency in the instruction pipeline in order to meet the ever-increasing performance demand of high performance DSP applications.

SUMMARY OF THE INVENTION

Accordingly, the present invention offers a method and system for performing floating point operations in unnormalized format using a floating point accumulator. The present invention provides a set of floating point instructions and also a floating point accumulator for storing the results of the operations in unnormalized format. Since the present invention operates on and stores floating point numbers in unnormalized format, the normalization step in the implementation of the floating point operations, which is typically required in the prior art, is readily eliminated. The present invention thus provides significant improvements in both time and space efficiency over prior art implementations of floating point operations. In digital signal processing applications, where floating point operations are used extensively for sums of products calculations, the performance improvements afforded by the present invention are further magnified by the elimination of normalization in each of numerous iterations of multiply and add instructions. A method for computing floating point operations and the circuitry used by the method are described herein. These and other advantages of the present invention not specifically described above will become clear within discussions of the present invention herein.

Specifically, one embodiment of the method of the present invention includes computing the product of two operands during a first instruction cycle and storing the product in an accumulator in unnormalized form. This exemplary embodiment implements the floating point multiply and load (fmal) instruction of the present invention. Another embodiment of the method of the present invention includes the above steps and further includes computing the product of two other operands during the next immediate instruction cycle while the first product remains in the accumulator in unnormalized form and then adding the newly computed product to (or subtracting the newly computed product from) the value in the accumulator. These additional steps implement the floating point multiply and add (fmal) (or floating point multiply and subtract (fmal), respectively) instruction of the present invention. Yet another embodiment of the method of the present invention includes the above steps and further includes computing a normalized result by normalizing value as stored in the accumulator and optionally writing the normalized result to a designated register. These additional steps in turn implement the floating point normalize and write (fmal) instruction of the present invention.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
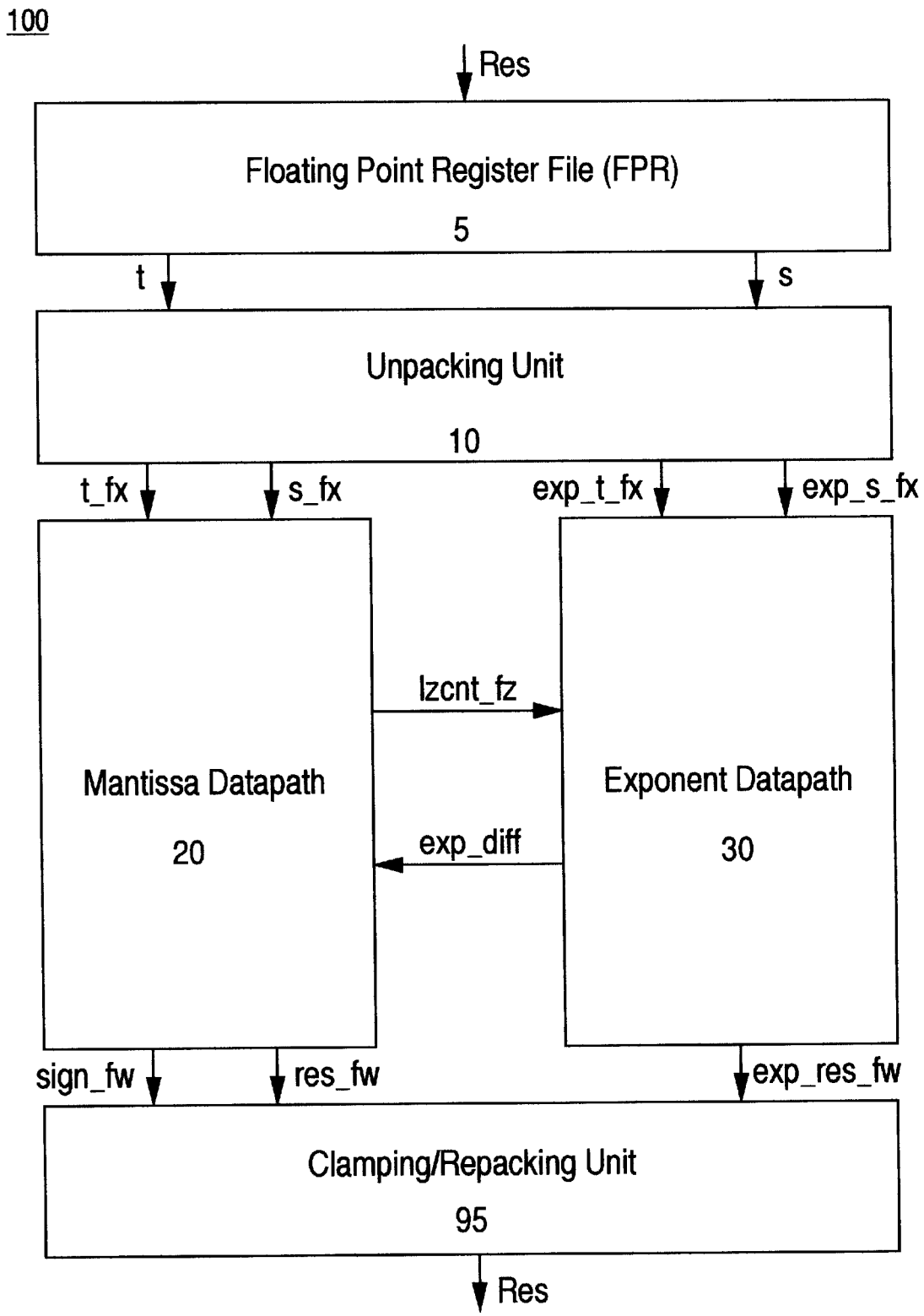
FIG. 1 illustrates a high level block diagram of the floating point unit (FPU) 100 in accordance with the present invention.

In the following detailed description of the present invention, a method and system for performing floating point operations in unnormalized format using a floating point accumulator, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

The present invention provides a highly efficient method and circuit system for performing floating point operations and includes a floating point unit 100, described below with reference to FIG. 1, and a set of four instructions utilizing FPU 100 to implement sums of products computations involving floating point operands. In a preferred embodiment, FPU 100 of the present invention constitutes a portion of the signal processor of the media co-processor of a computer system. As described in more detail below, FPU 100 and the floating point instructions of the present invention enable the result of an instruction to be used in the next immediate cycle in the instruction pipeline. In other words, the floating point instructions of the present invention, in conjunction with FPU 100, eliminate the multi-cycle latency characteristic of the prior art, thereby making available a computational result for use by a subsequent instruction in the next immediate pipeline cycle.

Specifically, in any given iteration of a sum of products calculation, the product of two operands is added to a running total of previously calculated products. Moreover, it is appreciated that the performance of sums of products calculations can be enhanced by combining the multiplication and addition into a single instruction. Thus, the present invention provides a floating point multiply and add (fmac) instruction comprising a multiplication step and an addition step, where the product of two operands in the multiplication step is an operand to the addition step. In particular, the addition step involves adding the product generated by the multiplication step to the value stored in an accumulator register or "accumulator". By definition, an accumulator itself furnishes one of the two operands to the addition step whose result is stored immediately back into the accumulator. Therefore, during a sum of products calculation, the accumulator effectively stores a running total representing a partial sum of all products that are to be added together, where each partial sum equals the intermediate result of the sum of products calculation up to the particular iteration in question.

Furthermore, to allow for a product to be subtracted from, instead of being added to, the running total stored in the accumulator, the present invention also provides a corresponding floating point multiply and subtract (fmsc) instruction. In this regard, it is observed that a subtraction from the accumulator is equivalent to an addition to the accumulator in which the value to be subtracted is negated and then added to the accumulator. Thus, in a preferred embodiment of the present invention, the fmsc instruction is implemented in similar fashion to the fmac instruction but with the appropriate modifications based on the above observation. For ease of reference, the fmac and fmsc instructions are collectively called FMAC-class instructions.

Thus, by using a floating point accumulator to store the result of an FMAC-class instruction and thus eliminating the need to write the result of every FMAC-class instruction to a separate register and then load that same result back as an operand for the next instruction, the present invention provides better performance in sums of products calculations than prior art implementations of floating point operations.

It is appreciated that conventional implementations of the addition of two floating point operands to generate a normalized result require a shifter, an adder, a leading zero detector and a second shifter. This hardware configuration in turn requires at least two pipeline stages to implement. Thus, if this conventional hardware configuration is used in the present invention, there would be a latency of at least two instruction cycles with respect to the FMAC-class instructions. In other words, at a minimum, there has to be one wasted cycle between two consecutive. FMAC-class instructions if the result is to be normalized before it is made available to a subsequent instruction. However, the present invention provides a better circuit embodiment.

Importantly, it is further appreciated that if normalization needs not be performed between successive FMAC-class instructions, a shifter and an adder are adequate to perform the addition step of the instructions, and that the shifter and the adder can be implemented in a single pipeline stage. Thus, in accordance with the present invention, the result of an FMAC-class instruction is stored directly in the accumulator without undergoing normalization so that a leading zero detector and a second shifter are no longer needed to implement the addition step. Consequently, in the present invention, the latency of the FMAC-class instructions is reduced to one cycle and the result can be made available as an operand for the instruction in the immediate next cycle, which proceeds while the earlier result remains in unnormalized form. Such reduction in latency enables further performance improvement over the prior art, especially in sums of products calculations where the numbers of iterations are large, as is typically the case in modem DSP applications.

Additionally, it is appreciated that the present invention provides an avenue by which the accumulator is populated with an initial value. The present invention includes a floating point multiply and load (fmal) instruction expressly for this purpose. More particularly, the final instruction performs an initialization by loading the product of two operands into the accumulator. Conveniently, this product represents the first of a series of products that are to be added up in a sum of products calculation. Importantly, in accordance with the present invention, the product value is stored in the accumulator in unnormalized form. Once the accumulator has been so initialized, products of additional pairs of operands can be added to or subtracted from the accumulator using the appropriate FMAC-class instruction in succession until all desired iterations for a sum of products calculation are completed.

Since the value in the accumulator is kept in unnormalized form, the present invention provides a floating point normalize and write (fmaw) instruction for a user to request that the value in the accumulator be normalized and then optionally written to a floating point register file (FPR). In accordance with the present invention, the accumulator serves as a source of the value to be normalized during the final instruction. However, the. content of the accumulator itself is not modified by the fmaw instruction. Thus, in a microcode program, when further computations are to be performed after a fmaw instruction, a fmal instruction typically follows the fmaw instruction in order to reload the cumulation with the updated value.

With reference to FIG. 1, a high level block diagram of the floating point unit (FPU) 100 in accordance with the present invention is illustrated. The floating point unit 100 comprises a floating point register file (FPR) 5 which, in a preferred embodiment, is 32-bit wide for handling single precision floating point numbers. Coupled to FPR 5 is an unpacking unit 10 for receiving two 32-bit floating point operands, t and s, from FPR 5 and for separating each operand into its mantissa, exponent and sign bit. Unpacking unit 10 is coupled to a mantissa datapath 20 and an exponent datapath 30. Mantissa datapath 20 receives the 24-bit mantissas t_fx and s_fx of the two operands, while exponent datapath 30 receives the 8-bit exponents exp_t_fx and exp_s_fx of the two operands from unpacking unit 10 for further processing. The bit sizes of the above elements can vary within the scope of the present invention.

Still referring to FIG. 1, mantissa datapath 20 and exponent datapath 30 are coupled to each other. In particular, mantissa datapath 20 receives from exponent datapath 30 data signal exp_diff, which represents the difference between the exponent of the product to be added to the accumulator and the value currently stored in the exponent portion of the accumulator. On the other hand, exponent datapath 30 receives from mantissa datapath 20 data signal lzcnt_fz, which represents a leading zero count of the value in the mantissa portion of the accumulator. The interactions between mantissa datapath 20 and exponent datapath 30 and also the activities within the datapaths 20 and 30 themselves are described in detail further below.

FIG. 1 also illustrates that mantissa datapath 20 and exponent datapath 30 are each coupled to a clamping/repacking unit 95. In particular, when a final result (Res) needs to be written to FPR 5, repacking unit 95 receives the 23-bit fractional portion of the result's mantissa res_fw from mantissa datapath 20. Repacking unit 95 also receives the 8-bit exponent of the result exp_res_fw from exponent datapath 30. Moreover, repacking unit 95 receives a sign bit representing the sign of the result from mantissa datapath 20. With these inputs, repacking unit 95 generates the 32-bit result Res, which can then be written to FPR 5.

Figure 2A:
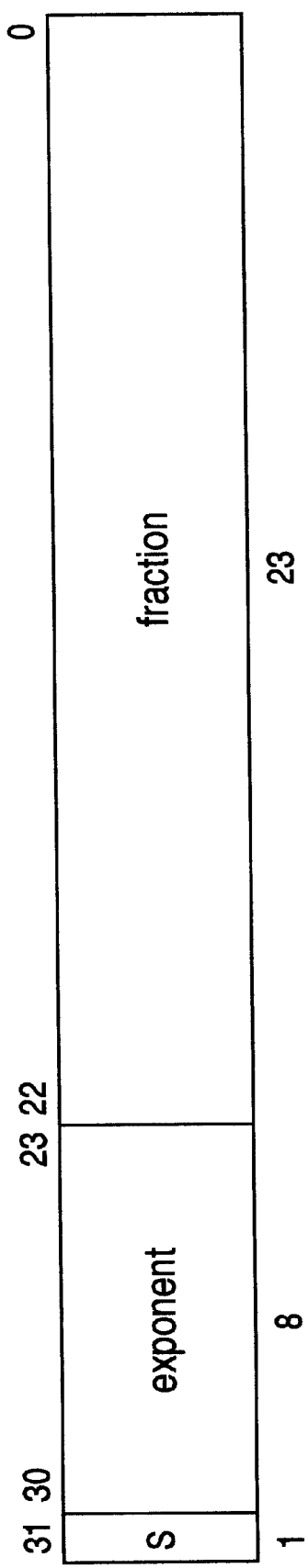
FIG. 2A illustrates the format of a normalized 32-bit single precision floating point number as specified by the IEEE 754-1985 standard.

FIG. 2A illustrates the format of a normalized 32-bit single precision floating point number as specified by the IEEE 754-1985 standard. As is well known in the art, the value represented by the floating point number shown in FIG. 2A is:

$$(-1)^{S} * 2^{E} * 1.b_{22}b_{21} \ldots b_{0}$$

where S is the sign bit, E is the 8-bit exponent less the bias (for single precision floating point numbers, the bias is 127) and $b_{22}b_{21} \ldots b_{0}$ is the 23-bit fractional portion of the mantissa. The implicit hidden bit of '1' to the immediate left of the decimal point is not stored in this format.

Figure 2B:
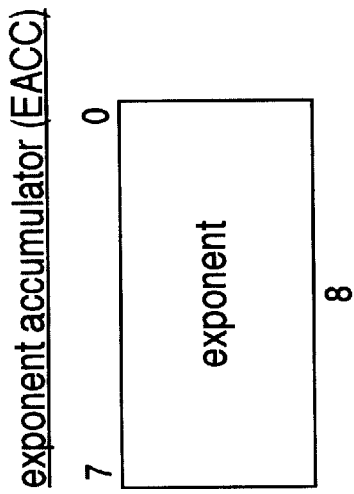
FIG. 2B illustrates an unnormalized "fixed.fraction" floating point format of a number stored in the accumulator in accordance with the present invention.
Figure 2B:
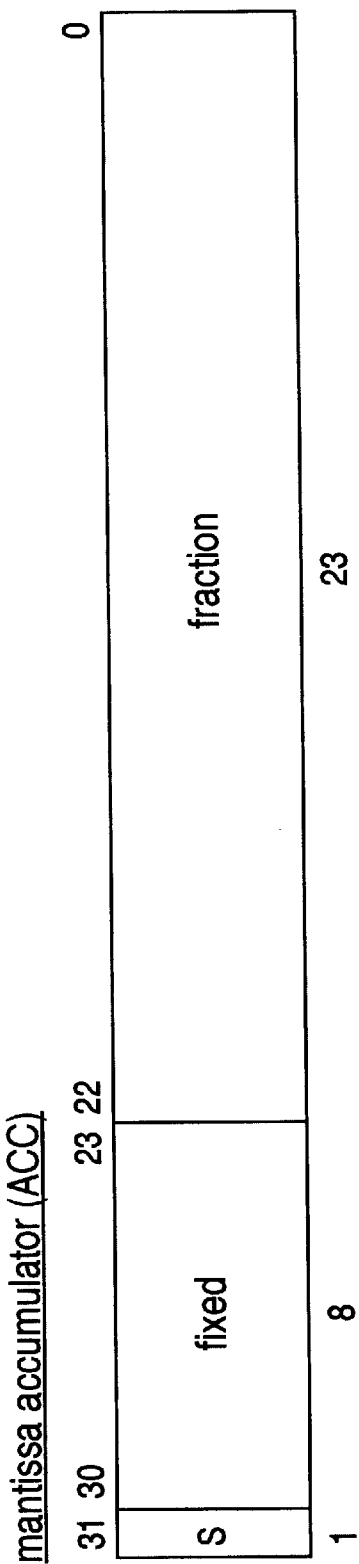

In contrast, FIG. 2B illustrates an unnormalized "fixed-.fraction" floating point format of a number stored in the accumulator in accordance with the present invention. Here, the value represented by the number in unnormalized "fixed-.fraction" floating point format as shown in FIG. 2B is:

$$(-1)^{S} * 2^{E} * f_{30}f_{29} \ldots f_{23}.b_{22}b_{21} \ldots b_{0}$$

where S is the sign bit, E is the 8-bit exponent less the bias (for single precision floating point numbers, the bias is 127), $f_{30}f_{29} \ldots f_{23}$ is the 8-bit fixed point portion of the mantissa and $b_{22}b_{21} \ldots b_{0}$ is the 23-bit fractional portion of the mantissa. More specifically, the number is maintained in 2's complement fixed.fraction format. In other words, if the sign bit is '0', the value can be more simply represented as:

$$2^{E} * f_{30}f_{29} \ldots f_{23}.b_{22}b_{21} \ldots b_{0}$$

whereas if the sign bit is '1', the value can be represented as:

$$-1 * 2^{E} * (2^{32} - f_{30}f_{29} \ldots f_{23}.b_{22}b_{21} \ldots b_{0})$$

and the number remains in unpacked or unnormalized form irrespective of the value of the sign bit. In accordance with the present invention, an 8-bit exponent accumulator register is included in exponent datapath 30 and a 32-bit mantissa accumulator register is included in mantissa datapath 20. As described in greater detail below, the exponent accumulator and the mantissa accumulator together constitute a novel floating point accumulator for implementing the four floating point instructions of the present invention by using this unnormalized "fixed.fraction" floating point format advantageously over the prior art.

Figure 3:
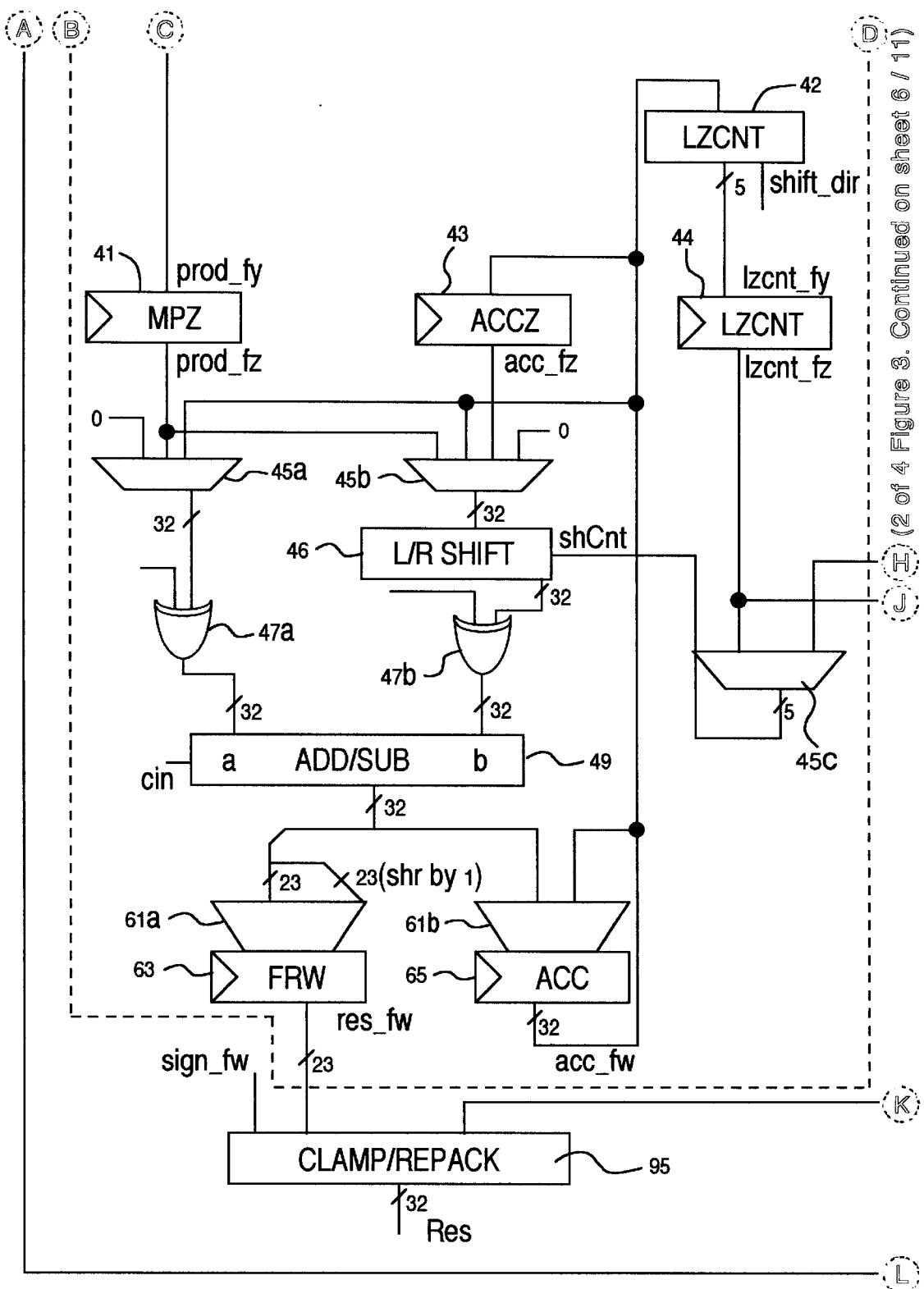
FIG. 3 illustrates an exemplary hardware implementation of FPU 100 in accordance with the present invention.

Next, FIG. 3 illustrates an exemplary hardware implementation of FPU 100 in accordance with the present invention. It is noted that data flows within FPU 100 differ among the four floating point instructions of the present invention. Thus, different hardware components of FPU 100 are utilized by each instruction, with some overlaps among the instructions. As such, the exemplary implementation of FPU 100 as shown in FIG. 3 is best described in conjunction with each of the floating point instructions provided by the present invention.

It is appreciated that the four floating point instructions of the present invention are implemented using instruction pipelining. As is well known in the art, pipelining is an implementation technique whereby multiple instructions are overlapped in execution in a pipeline having a series of steps. An instruction is divided into portions and each step in the pipeline, commonly called a pipeline stage, completes a portion of the instruction. The time required to complete a pipeline stage is called a machine cycle or an instruction cycle. This terminology is used to describe the four floating point instructions of the present invention is detail below.

Figure 4:
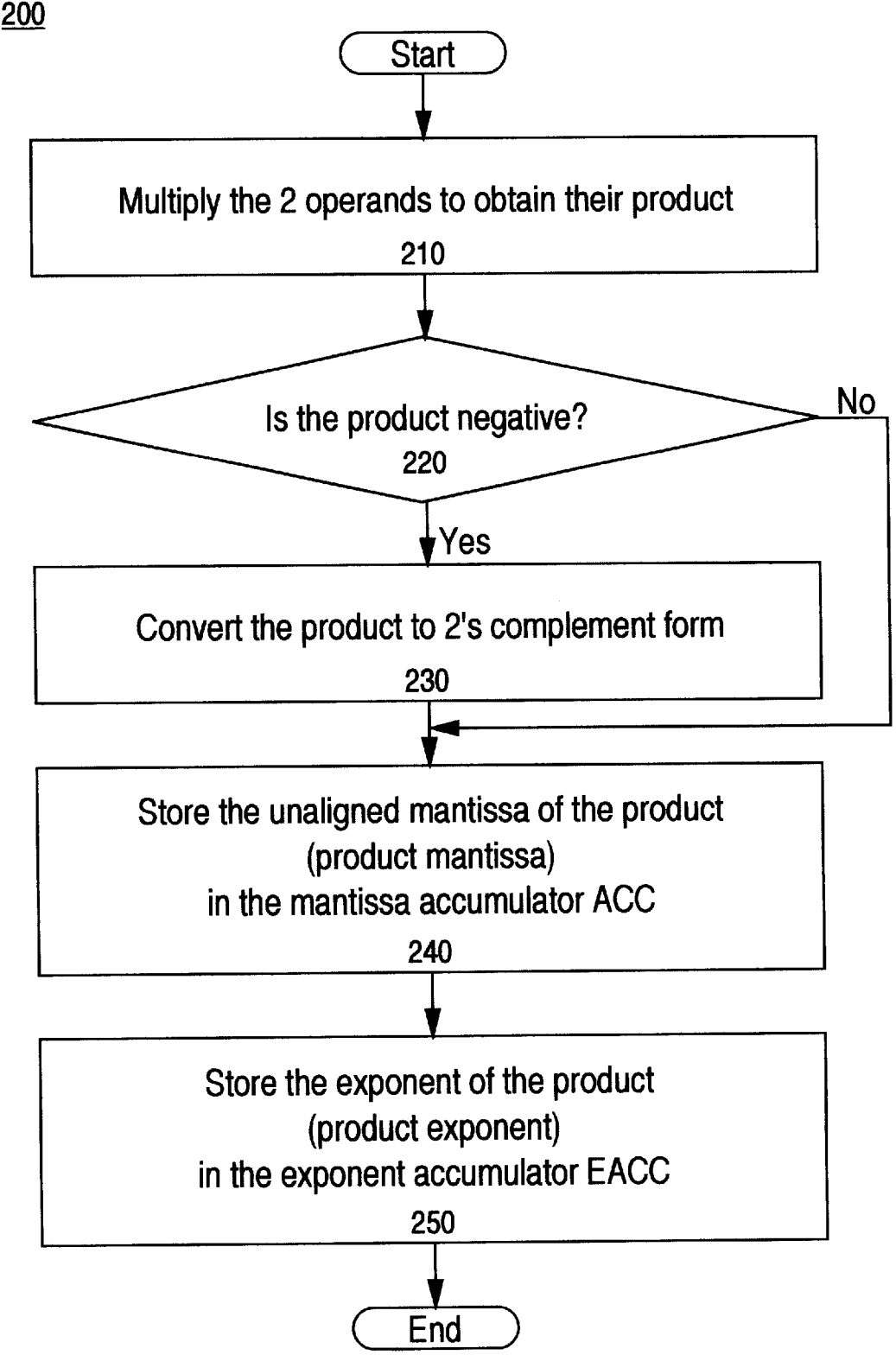
FIG. 4 is a flow diagram illustrating steps used by one instruction, the fmal instruction, to initialize the accumulator in accordance with the present invention.

FIG. 4 is a flow diagram of process 200 having steps used by the final instruction to initialize the accumulator in accordance with the present invention. In step 210, the final instruction multiplies two floating point operands to obtain their product, comprising the product mantissa and the product exponent. The corresponding data flow is described with reference to the circuit of FIG. 3.

As shown in FIG. 3, unpacking unit 10 comprises registers 11a and 11b and unpacking circuits 13a and 13b. In the X stage of the final instruction, unpacking circuits 13a and 13b receive the two operands from registers 11a and 11b and unpack each operand into a 24-bit mantissa, an 8-bit exponent and a sign bit. The 24-bit mantissas are then passed to mantissa datapath 20 and are received by multiplier 21 which, in a preferred embodiment, is a 24×24 CSA multiplier array. Multiplier 21 generates the 48-bit sum and carry partial products of the mantissas and stores them in registers 23a and 23b. At the same time, the 8-bit exponents are passed to exponent datapath 30 and are received by adder 31, which also receives the bias as a third input. Using these three inputs, adder 31 generates the product exponent and stores it in register 33.

Then, in stage Y of the final instruction, registers 23a and 23b of mantissa datapath 20 pass the sum and carry partial products to adder 25, which adds the sum and carry to compute the product mantissa and stores it in register 41. In exponent datapath 30, the product exponent in register 33 is simply piped to the next stage through multiplexer (mux) 51 and stored in register 53.

It is appreciated that since the input mantissas are in the range (2.0,1.0] (e.g., the range having an upper limit of 2.0 exclusive and a lower limit of 1.0 inclusive), the product mantissa would be in the range (4.0,1.0] (e.g., the range having an upper limit of 4.0 exclusive and a lower limit of 1.0 inclusive). Thus, two integer bits to the left of the decimal point are needed to accommodate a product mantissa that is larger than 2.0. Accordingly, the output data bus of adder 25 is 25-bit rather than 24-bit wide, so that the fractional portion of the product mantissa still has 23 bits of precision while the integer portion is 2-bit wide.

Referring back to FIG. 4, in step 220, the final instruction determines whether the product of the two floating point operands is negative or not. If it is determined in step 220 that the product is negative, the product mantissa is converted to 2's complement form in mantissa datapath 20 in step 230. Then, in step 240, the converted product mantissa is stored in the mantissa accumulator. On the other hand, if it is determined in step 220 that the product is not negative, the final instruction proceeds directly to step 240 in which the product mantissa is stored in the mantissa accumulator. At the same time, in exponent datapath 30, the product exponent is stored in the exponent accumulator without modification in step 250. The final instruction then terminates. The corresponding data flow is again described with reference to FIG. 3.

Thus, referring to FIG. 3, in stage Z of the final instruction, the sign of the product of the two floating point operands is determined. In a preferred embodiment, the present invention computes the "exclusive or" (XOR) of the sign bits of the two floating point operands furnished by unpacking circuits 13a and 13b to determine the sign of the product. Specifically, if the XOR result is '0', the two operands are of the same sign and their product must be non-negative. If the XOR result is '1', the two operands have different signs and so their product must be negative.

Still referring to FIG. 3, the product mantissa stored in register 41 in mantissa datapath 20 is selected by mux 45a and fed as an input into XOR gate 47a, whose other input is the XOR result of the two operands' sign bits as described above. The output of XOR gate 47a is fed to input a of add/subtract unit 49, while input b of add/subtract unit 49 is set to '0'. Further, if the product of the two operands is negative, the cin input of add/subtract unit 49 is set to '1'. Thus, if the product of the two operands is negative (their sign bits' XOR result being '1'), the output of XOR gate 47a is the product mantissa with every bit inverted, to which is added the cin of '1' by add/subtract unit 49. The output of add/subtract unit 49 is therefore the 2's complement of the product mantissa in this case. On the other hand, if the product of the two operands is non-negative (their sign bits' XOR result being '0'), the output of XOR gate 47a is the unaltered product mantissa, which then passes through add/subtract unit 49 unchanged as well. In either case, the resulting product mantissa is selected via mux 61b and passed to mantissa accumulator register (ACC) 65 to be stored. ACC 65 is thus loaded with the unaligned product mantissa. In exponent datapath 30, the product exponent in register 53 is selected by mux 71a and directly stored in exponent accumulator register (EACC) 75. EACC 75 is thus loaded with the product exponent.

In a preferred embodiment, ACC 65 (FIG. 3) is a 32-bit register with bit 31 as the sign bit, bits [30:23] as the 8 overflow bits and bits [22:0] as the 23-bit mantissa. Moreover, in a preferred embodiment, EACC 75 is an 8-bit register for storing the 8-bit exponent which represents the range of the accumulated value.

As illustrated in FIG. 3, no activity occurs in stage W of the fmal instruction. In particular, no write to FPR 5 is performed by the fmal instruction in accordance with the present invention.

Hence, with ACC 65 and EACC 75 loaded with the product mantissa and the product exponent, respectively, as computed from the two operands, the floating point accumulator of the present invention is properly initialized by the fmal instruction.

Figure 5:
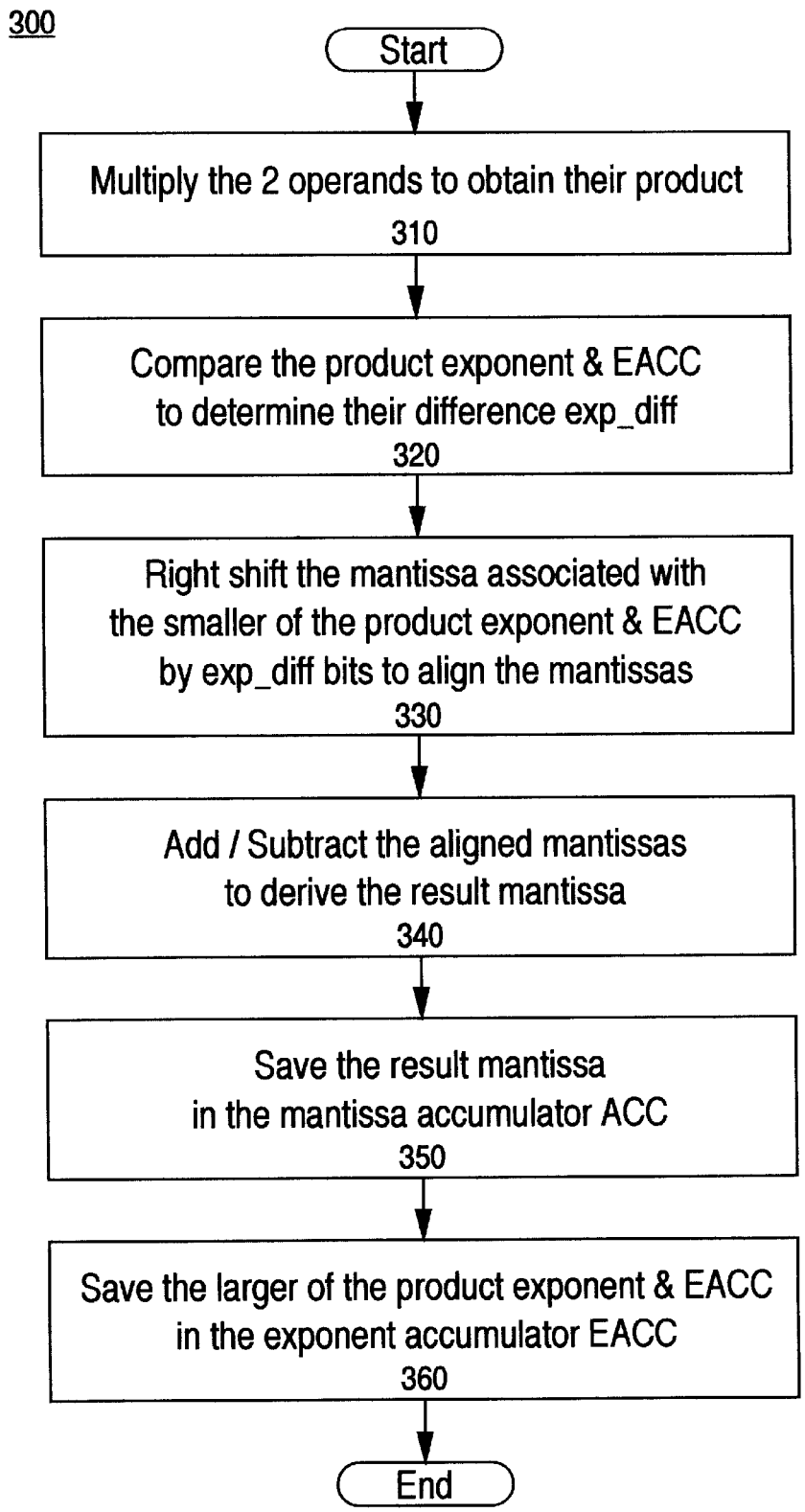
FIG. 5 is a flow diagram illustrating steps used by other instructions, the fmac and fmsc instructions, to add a product to, and to subtract a product from, respectively, the value in the accumulator in accordance with the present invention.

FIG. 5 is a flow diagram of process 300 having steps used by the FMAC-class instructions, including the fmac and fmsc instructions, to add a product to, and to subtract a product from, respectively, the value in the accumulator in accordance with the present invention. It is appreciated that the two FMAC-class instructions use the accumulator not only as a source for one of the inputs to the addition or subtraction step but also as a destination for storing the result. In step 310, the FMAC-class instruction multiplies two floating point operands to obtain their product, comprising the product mantissa and the product exponent. The corresponding data flow is described with reference to FIG. 3.

Referring to FIG. 3, in the X stage of the FMAC-class instruction, unpacking circuits 13a and 13b receive the two operands from registers 11a and 11b and unpack each operand into a 24-bit mantissa, a 8-bit exponent and a sign bit. The 24-bit mantissas are then passed to mantissa datapath 20 and are received by multiplier 21, which generates the 48-bit sum and carry partial products of the mantissas and stores them in registers 23a and 23b. At the same time, the 8-bit exponents are passed to exponent datapath 30 and are received by adder 31, which also receives the bias as a third input. Using these three inputs, adder 31 generates the product exponent and stores it in register 33.

Then, in stage Y of the FMAC-class instruction, registers 23a and 23b of mantissa datapath 20 pass the sum and carry partial products to adder 25, which adds the sum and carry to compute the product mantissa and stores it in register 41. In exponent datapath 30, the product exponent in register 33 is simply piped to the next stage through mux 51 and stored in register 53.

As described above with respect to the final instruction, the output data bus of adder 25 is 25-bit wide so that the fractional portion of the product mantissa still has 23 bits of precision while the integer portion is 2-bit wide for accommodating a product mantissa that is larger than 2.0.

Referring back to FIG. 5, in step 320, in exponent datapath 30, the FMAC-class instruction compares the product exponent with the value in the exponent accumulator to determine their difference, which is denoted as exp_diff for ease of reference. Then, in step 330, in mantissa datapath 20, the mantissa associated with the value having the smaller exponent is right shifted by exp_diff bits in order to align the two mantissas. In other words, if it is determined in step 320 that there is no difference between the two exponents (exp_diff=0), mantissa shifting is not necessary. Next, in step 340, depending on the respective signs of the product and the value in the accumulator and also the specific FMAC-class instruction, the mantissas of the two operands are either added or subtracted, as appropriate, to derive the result mantissa. In step 350, the result mantissa is stored in the mantissa accumulator. Meanwhile, in step 360, in exponent datapath 30, the larger of the product exponent and the value in the exponent accumulator is stored back in the exponent accumulator. The corresponding data flow is again described with reference to FIG. 3.

Thus, referring to FIG. 3, in stage Z of the FMAC-class instruction, the difference exp_diff between the product exponent and the value in the exponent accumulator is determined. In a preferred embodiment, the present invention uses subtractor 55 to receive the value in the exponent accumulator from EACC 75 and the product exponent from register 53. The product exponent is then subtracted from the value in the exponent accumulator to determine the difference exp_diff. The value exp_diff is selected by mux 45c and passed to shifter 46 as a shift count (ShCnt) indicating the number of bits by which the mantissa associated with the value having the smaller exponent is to be right shifted in order to align the two mantissas. Specifically, in mantissa datapath 20, mux 45a and 45b receive the product mantissa from register 41 and the value in the exponent accumulator from ACC 65. The mantissa associated with the value having the larger exponent is selected by mux 45a and sent to input a of add/subtract unit 49 unchanged via XOR gate 47a, while the other mantissa (that associated with the value having the smaller exponent) is selected by mux 45b and sent to shifter 46, which right shifts its input mantissa by exp_diff bits so as to align the two mantissas at their decimal points. Thereafter, the shifted mantissa is sent to input b of add/subtract unit 49 via XOR gate 47b without further changes.

Once the requisite shifting is completed, the two mantissas are either added or subtracted in add/subtract unit 49, depending on the respective signs of the product and the value in the accumulator and also the specific FMAC-class instruction, to derive the result mantissa. For instance, if the instruction involved is the fmac instruction and the signs of the product and the value in the accumulator are equal, then an addition is performed by add/subtract unit 49. As another example, if the instruction involved is again the fmac instruction but the signs of the product and the value in the accumulator are not equal, a subtraction is performed by add/subtract unit 49. In any event, the result mantissa is sent as the output of add/subtract unit 49 to ACC 65 via mux 61b and stored. ACC 65 is thus updated with the result mantissa. In exponent datapath 30, mux 71a receives the product exponent from register 53 and the value in the exponent accumulator from EACC 75. Mux 71a then selects the larger of the two values and stores it back in EACC 75. EACC 75 is thus updated with the proper result exponent.

As illustrated in FIG. 3, no activity occurs in stage W of the FMAC-class instructions. In particular, no write to FPR 5 is performed by the FMAC-class instructions in accordance with the present invention.

As such, the respective FMAC-class instruction adds to or subtracts from the floating point accumulator the product value derived from the two operands. In particular, ACC 65 and EACC 75 are updated with the result mantissa and the result exponent, respectively, in accordance with the present invention.

As stated above, in a preferred embodiment of the present invention, ACC 65 is a 32-bit register with bit 31 as the sign bit, bits [30:23] as the 8 overflow bits and bits [22:0] as the 23-bit mantissa. Further, in a preferred embodiment, both shifter 46 and add/subtract unit 49 support 32-bit operations. It is appreciated that in this preferred embodiment, at least 255 operands, whose mantissas are always in the range [2.0,1.0] (e.g., the range having an upper limit of 2.0 exclusive and a lower limit of 1.0 inclusive), can be accumulated in the accumulator using the FMAC-class instructions without the possibility of overflow. In other words, the FMAC-class instructions can be repeatedly invoked to process 255 operands without requiring normalization of the value in the accumulator to prevent an overflow. As described above, given the [2.0,1.0] range of the operands' mantissas, the product of any two incoming mantissas would fall in the range [4.0,1.0] (e.g., the range having an upper limit of 4.0 exclusive and a lower limit of 1.0 inclusive). When this product is added to the accumulator, the resulting sum can be stored in the mantissa accumulator because this embodiment of the present invention includes bits [30:23] as overflow bits, thus enabling the fixed portion of the accumulated result mantissa to grow from bit 23 towards and up to bit 30. These 8 bits in the fixed portion of the mantissa accumulator makes it possible for the present invention to perform repeated accumulations of at least 255 operands without normalization because the result would not exceed the range supported by the mantissa accumulator having the 8-bit fixed portion.

Furthermore, it is appreciated that extra precision in the mantissa can be acquired through repeated FMAC-class instructions in accordance with the present invention. In particular, if the accumulated result is greater than 2.0, the fixed portion of the result mantissa grows towards bit 30 and extra precision beyond 23 bits is thereby acquired. On the other hand, if the accumulated result is less than 0.5, the result mantissa still retains the 23-bit fractional portion, so that precision is maintained at 23 bits.

Additionally, in one embodiment of the present invention, the FPU hardware does not track potential overflow and does not automatically initiate a normalization to prevent an overflow. In particular, if a result mantissa cannot fit within the 31 bits of the fixed and fractional portions, the value would overflow into the sign bit and change the sign of the resulting value when accumulation is attempted. Thus, it is up to the microcode programmer using the FMAC-class instructions provided by the present invention to ensure via software that no overflow occurs. This can be achieved, for example, by putting in place appropriate code to monitor the magnitude of the mantissa stored in the accumulator, perform a normalization as necessary, and save the accumulated result in an architecturally specified register in the FPR. The normalization and saving of the result can be done using the fmaw instruction of the present invention, which is described in detail below. The accumulator can then be reloaded with the updated result for further processing using the fmal instruction as described above.

Figure 6:
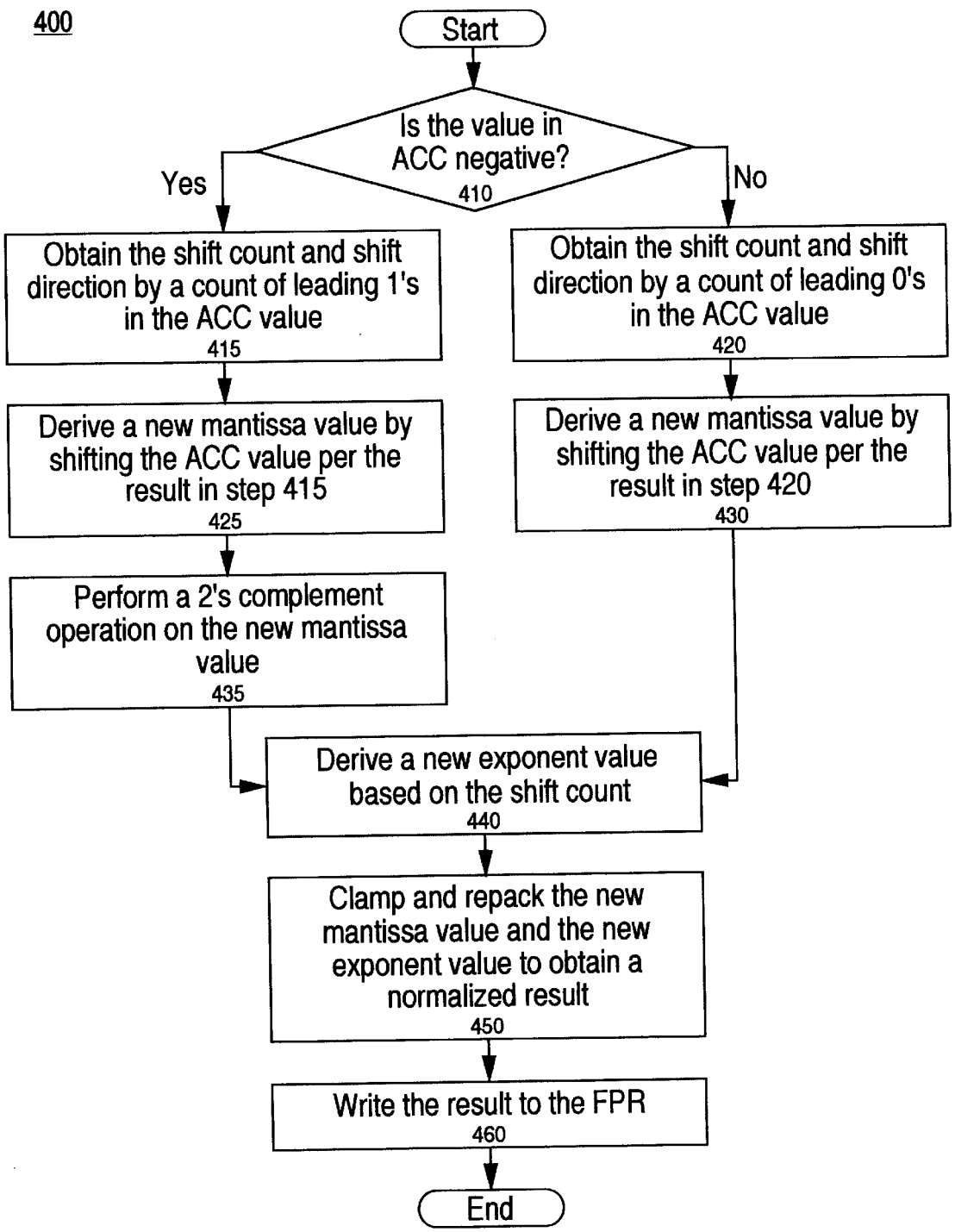
FIG. 6 is a flow diagram illustrating steps used by another instruction, the fmaw instruction, to normalize the value of the accumulator and to write the normalized value to the floating point register file in accordance with the present invention.

FIG. 6 is a flow diagram of process 400 having steps used by the fmaw instruction to normalize the value of the accumulator and to write the normalized value to the FPR in accordance with the present invention. It is appreciated that the fmaw instruction uses the accumulator as a source but does not modify its content. In step 410, the fmaw instruction retrieves the value in the accumulator determines whether it is negative or not. If it is determined in step 410 that the value in the accumulator is negative, the shift count and shift direction for normalization is obtained by a count of leading ones in the mantissa accumulator's stored value in step 415. Next, in step 425, a new mantissa value is derived by shifting the value stored in the mantissa accumulator by the count of leading ones obtained in step 415. Then, in step 435, a 2's complement operation is performed on the new mantissa value derived in step 425. On the other hand, if it is determined in step 410 that the value in the accumulator is not negative, the fmaw instruction proceeds to step 420 in which the shift count and shift direction for normalization is obtained by a count of leading zeroes in the mantissa accumulator's value. Then, in step 430, a new mantissa value is derived by shifting the value stored in the mantissa accumulator by the count of leading zeroes obtained in step 420. Meanwhile, in step 440, in exponent datapath 30, a new exponent value is derived based on the shifting performed on the mantissa value. The corresponding data flow is described with reference to FIG. 3.

Referring to FIG. 3, no activity occurs in the X stage of the fmaw instruction. Then, in stage Y of the fmaw instruction, a new mantissa value is derived by an appropriate shifting. Specifically, in a preferred embodiment, register 43 and leading zero/one counter 42 receive the value in the mantissa accumulator from ACC 65. Leading zero/one counter 42 then generates two outputs, one which indicates the proper shift direction (shift_dir) and another which indicates the shift count (lzcnt_fy) for normalization. More particularly, it is appreciated that if the input value to leading zero/one counter 42 is negative, a leading ones count is generated as the shift count; otherwise, a leading zeroes count is generated as the shift count. Moreover, it is appreciated that the shift count can be positive or negative depending on where in the input value the first zero/one is encountered by leading zero/one counter 42, and that the sign of the shift count represents the proper shift direction needed for normalization.

For example, in a leading zeroes count, if the first '1' is located to the left of the decimal point (between bits 22 and 23), a right shift is necessary for normalization. Conversely, if the first '1' is located to the right of the decimal point, a left shift is necessary for normalization. It is appreciated that a leading ones count operates in similar fashion as a leading zeroes count, with the difference being that the search is for the first '0' rather than for the first '1'. In either case, leading zero/one counter 42 generates the two outputs to indicate the proper shift direction and shift count for normalization accordingly. The shift count output from leading zero/one counter 42 is stored in register 44, while the value in the mantissa accumulator from ACC 65 is stored in register 43 unaltered. In exponent datapath 30, the value in the exponent accumulator is received from EACC 75 by register 53 through mux 51 and stored therein.

Still referring to FIG. 3, in stage Z of the fmaw instruction, a new mantissa value and a new exponent value is derived for normalization. In a preferred embodiment of the present invention, the shift count stored in register 44 is selected by mux 45c and passed to shifter 46 indicating the number of bits by which the mantissa is to be shifted for normalization. The shift direction output from leading zero/one counter 42 is also received by shifter 46. In addition, the value in the exponent accumulator as stored in register 43 is selected by mux 45b and passed to shifter 46 as the data input. Shifter 46 then performs the proper shifting accordingly and directs its output to input b of add/subtract unit 49 via XOR gate 47b. If the value in the exponent accumulator as stored in register 43 is negative, a 2's complement operation is performed by inverting the shifted value via XOR gate 47b before sending it as input b of add/subtract unit 49 and at the same time setting the cin input of add/subtract unit 49 to '1'; otherwise, the shifted value passes through XOR gate 47b and add/subtract unit 49 unchanged. It is appreciated that the 2's complement operation can generate a result that would cause an overflow to bit 24 if the value exceeds the range of the 23-bit fractional portion of the mantissa. Under such circumstances, an additional 1-bit right shift is performed through mux 61a before the result is sent to register 63 and saved. If there is no overflow, mux 61a simply passes the output of add/subtract unit 49 to register 63 to be saved.

With reference still to FIG. 3, in exponent datapath 30, add/subtract unit 59 receives the value in the exponent accumulator from register 53 and the shift count from register 44. If a right shift is being performed on the mantissa value in mantissa datapath 20, the shift count is added to the exponent value in add/subtract unit 59. On the other hand, if a left shift is being performed on the mantissa value, the shift count is subtracted from the exponent value in add/subtract unit 59. In either case, add/subtract unit 59 generates two outputs, one being the addition/subtraction result (exp_res_fz), and the other being the addition/subtraction result incremented by 1 (exp_res_fz+1). The two outputs are necessary to accommodate the additional 1-bit right shift in mantissa datapath 20 which is may be required to address an overflow as described above. Specifically, if the additional 1-bit right shift is required in mantissa datapath 20, mux 71*b* selects exp_res_fz+1 and stores it in register 73. If such additional 1-bit right shift is not required in mantissa datapath 20, mux 71*b* selects exp_res_fz instead and stores it in register 73. As such, the exponent value that gets stored in register 73 is properly adjusted for any additional 1-bit right shift in mantissa datapath 20 if necessary.

Referring back to FIG. 6, in step 450, in clamping/repacking unit 95, the fmaw instruction clamps and repacks the new mantissa value, the new exponent value and the sign of the value to obtain a normalized result, which is denoted as Res for ease of reference. Finally, in optional step 460, the normalized result is written to FPR 5. The corresponding data flow is again described with reference to FIG. 3.

Thus, with reference again to FIG. 3, in stage W of the fmaw instruction, clamping/repacking unit 95 receives the new mantissa value from register 63 and the new exponent value from register 73. Clamping/repacking unit 95 also receives the sign of the accumulator's value, which has been decided in step 410, from mantissa datapath 20. Clamping/repacking unit 95 clamps and repacks these portions of the accumulator's value to generate a normalized result as its output. This 32-bit output can then be optionally written to FPR 5.

Figure 7:
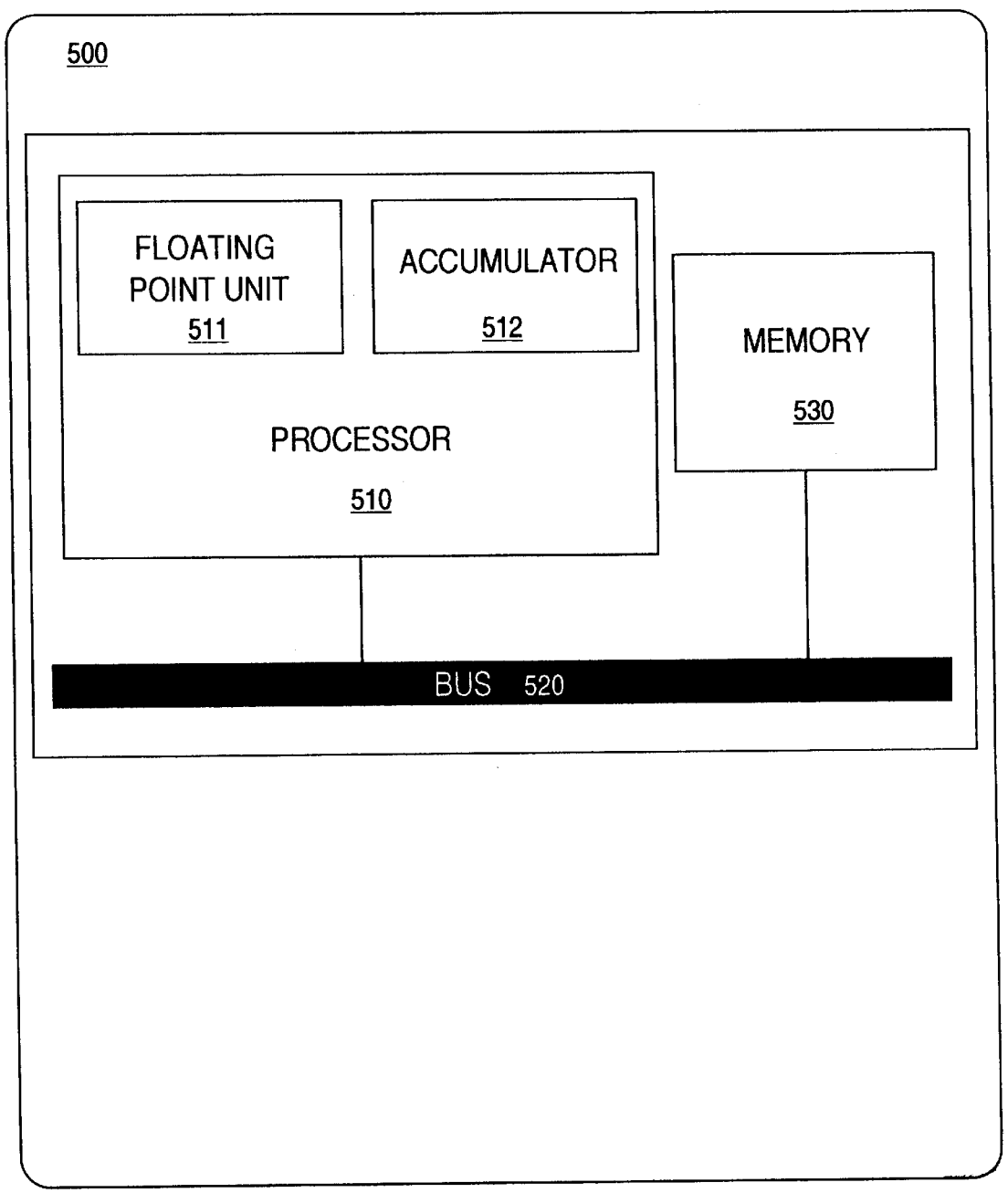
FIG. 7 is a block diagram illustrating the components of a computer system in accordance with one implementation of the present invention.

Referring to FIG. 7, a computer system 500 incorporates one embodiment of the present invention. The computer system 500 has components including a processor 510, an address/data bus 520 coupled to the processor and a computer readable memory 530, also coupled to the processor, for storing information.

Within the processor 510 are subcomponents including a floating point unit 511. The floating point unit 511 is for computing a first result for a first operation involving a first operand and a second operand, which is being performed during a first instruction cycle. Another subcomponent of processor 510 is an accumulator 512, which is for storing the first result in an unnormalized form.

The floating point unit 511 is also for computing a second result for a second operation involving a third operand and the first result. This second operation is performed during a second instruction cycle immediately following the first instruction cycle. The first result remains in the unnormalized form while the second operation is being performed. The floating point unit 511 is also for storing the second result in the accumulator, also in the unnormalized form. The floating point unit 511 is further also for computing a normalized result by normalizing the second result, and for writing this normalized result to a designated register of the computer system.

As such, the fmaw instruction normalized the value as stored in the floating point accumulator and optionally writes the normalized result to FPR 5. In the process, ACC 65 and EACC 75 are used as sources but not updated with the normalized value in accordance with the present invention.

It is appreciated that in one embodiment, the fmaw instruction has certain restrictions in its usage. Specifically, in the Y stage of the fmaw instruction, leading zero/one counter 42 obtains its input from ACC 65, which is a resource in the W stage. Thus, there should be no instruction that modifies the contents of ACC 65 in the intervening Z stage. In other words, any one of the fmal, fmac and fmsc instructions which is followed by a fmaw instruction imposes a 1 cycle stall in the instruction pipeline.

In the exemplary embodiments of the present invention as described above, boundaries are drawn between FPR 5, unpacking unit 10, mantissa datapath 20, exponent datapath 30 and clamping/repacking unit 95. However, these boundaries are arbitrary and are for illustrative purposes only, and can be modified within the spirit of the present invention. It is appreciated that one of ordinary skill in the art could readily implement the logic required to realize FPU 100 based on its description herein without adhering strictly to the exemplary circuit configuration described above.

The preferred embodiment of the present invention, a method and circuit system for performing floating point operations in unnormalized format using a floating point accumulator, is thus described. While the present invention has been described in particular embodiments, it should be appreciated that the present invention should not be construed as limited by such embodiments, but rather construed according to the below claims.

What is claimed is:

1. In a computer system having a floating point unit having an accumulator, a method for performing floating point operations, said method comprising the steps of:

a) computing a first result for a first operation involving a first operand and a second operand, said step a) being performed during a first instruction cycle, said first result for use in subsequent floating point computations involving at least a second operation; and b) storing said first result in memory cells representing said accumulator within said computer system in an unnormalized form.

2. A method for performing floating point operations as recited in claim 1 wherein said first result represents a multiplicative product of said first operand and said second operand.

3. A method for performing floating point operations as recited in claim 2 further comprising the step of:

c) computing a second result for said second operation involving a third operand and said first result, said step c) being performed during a second instruction cycle immediately following said first instruction cycle, wherein said first result remains in said unnormalized form while said second operation is being performed.

4. A method for performing floating point operations as recited in claim 3 further comprising the step of:

d) storing said second result in said memory cells representing said accumulator within said computer system in said unnormalized form.

5. A method for performing floating point operations as recited in claim 4 further comprising the steps of:

e) computing a normalized result by normalizing said second result; and f) writing said normalized result to a designated register of said computer system.

6. A method for performing floating point operations as recited in claim 3 wherein said third operand represents a multiplicative product of a fourth operand and a fifth operand.

7. A method for performing floating point operations as recited in claim 3 wherein said step c) comprises the steps of:

c1) computing said third operand as a multiplicative product of a fourth operand and a fifth operand; and c2) adding said third operand to said first result to obtain said second result, wherein said first result remains in said unnormalized form while said second operation is being performed.

8. A method for performing floating point operations as recited in claim 3 wherein said step c) comprises the steps of:
   c1) computing said third operand as a multiplicative product of a fourth operand and a fifth operand; and
   c2) subtracting said third operand from said first result to obtain said second result, wherein said first result remains in said unnormalized form while said second operation is being performed.

9. A method for performing floating point operations as recited in claim 3 wherein said accumulator comprises:
   a mantissa accumulator for storing a mantissa portion of said first result; and
   an exponent accumulator for storing an exponent portion of said first result;
   wherein said mantissa portion and said exponent portion of said first result in combination are a floating point representation of said first result.

10. A method for performing floating point operations as recited in claim 9 wherein said mantissa portion of said first result is stored in 2's complement form provided that said first result is negative.

11. A processor for performing floating point operations, said processor comprising:
   a floating point unit for computing a first result for a first operation involving a first operand and a second operand, said first operation being performed during a first instruction cycle;
   an accumulator within said processor for storing said first result in an unnormalized form; and
   said floating point unit also for computing a second result for a second operation involving a third operand and said first result, said second operation being performed during a second instruction cycle immediately following said first instruction cycle, wherein said first result remains in said unnormalized form while said second operation is being performed.

12. A processor for performing floating point operations as recited in claim 11 wherein said first result represents a multiplicative product of said first operand and said second operand.

13. A processor for performing floating point operations as recited in claim 12 wherein said floating point unit is also for storing said second result in memory cells representing said accumulator within said computer system in said unnormalized form.

14. A processor for performing floating point operations as recited in claim 13 wherein said floating point unit is also for:
   computing a normalized result by normalizing said second result; and for
   writing said normalized result to a designated register of said computer system.

15. A processor for performing floating point operations as recited in claim 14 wherein said third operand represents a multiplicative product of a fourth operand and a fifth operand.

16. A processor for performing floating point operations as recited in claim 14 wherein said floating point unit is further for:
   computing said third operand as a multiplicative product of a fourth operand and a fifth operand; and for
   adding said third operand to said first result to obtain said second result, wherein said first result remains in said unnormalized form while said second operation is being performed.

17. A processor for performing floating point operations as recited in claim 14 wherein said floating point unit is further for:
   computing said third operand as a multiplicative product of a fourth operand and a fifth operand; and for
   subtracting said third operand from said first result to obtain said second result, wherein said first result remains in said unnormalized form while said second operation is being performed.

18. A processor for performing floating point operations as recited in claim 14 wherein said accumulator comprises:
   a mantissa accumulator for storing a mantissa portion of said first result; and
   an exponent accumulator for storing an exponent portion of said first result;
   wherein said mantissa portion and said exponent portion of said first result in combination are a floating point representation of said first result.

19. A processor for performing floating point operations as recited in claim 18 wherein said mantissa portion of said first result is stored in 2's complement form provided that said first result is negative.

20. A computer system comprising:
   a processor;
   an address/data bus coupled to said processor;
   a computer readable memory coupled to said processor for storing information;
   a floating point unit within said processor for computing a first result for a first operation involving a first operand and a second operand, said first operation being performed during a first instruction cycle;
   an accumulator within said processor for storing said first result in an unnormalized form;
   wherein said floating point unit is also for:
      computing a second result for a second operation involving a third operand and said first result, said second operation being performed during a second instruction cycle immediately following said first instruction cycle, wherein said first result remains in said unnormalized form while said second operation is being performed; and
      storing said second result in said accumulator within said computer system in said unnormalized form; and
      computing a normalized result by normalizing said second result; and for
      writing said normalized result to a designated register of said computer system.

* * * * *